Dec. 12, 1967 N. GOLD 3,358,077

COLOR DECODER USING SINGLE SYNCHRONOUS DEMODULATOR

Filed Oct. 15, 1964 3 Sheets-Sheet 1

INVENTOR.
Nathan Gold

BY Brown and Mikulka
and
Donald M. Sandler
ATTORNEYS

COLOR DECODER USING SINGLE SYNCHRONOUS DEMODULATOR

Filed Oct. 15, 1964 3 Sheets-Sheet 2

INVENTOR.
Nathan Gold

BY Brown and Mikulka
and
Donald M. Sandler
ATTORNEYS

COLOR DECODER USING SINGLE SYNCHRONOUS DEMODULATOR

Filed Oct. 15, 1964 3 Sheets-Sheet 3

INVENTOR.
Nathan Gold
BY
Brown and Mikulka
and
Donald M. Sandler
ATTORNEYS

1

2

3,358,077

COLOR DECODER USING SINGLE SYNCHRONOUS DEMODULATOR

Nathan Gold, Sharon, Mass., assignor to Polaroid Corporation, Cambridge, Mass., a corporation of Delaware
Filed Oct. 15, 1964, Ser. No. 404,047
2 Claims. (Cl. 178—5.4)

This invention relates to decoders for recovering color information from color television signals transmitted in accordance with the technical standards established by the Federal Communications Commission in 1953, and more particularly to a decoder designed to recover from such signals, sufficient color information for a one-gun kinescope to be operated according to the red-white system of color analysis to produce a color picture of the scene being televised.

The red-white system of color analysis requires the relatively long wavelength (i.e., red) content of a scene to be displayed in reddish colored light and the relatively short wavelength (i.e., green) content of the scene to be displayed in achromatic light. A one-gun kinescope that operates according to this system of color analysis to produce a color picture of a scene being televised is disclosed in copending application Serial No. 297,341, filed July 24, 1963 now Patent No. 3,290,434, owned by the assignee of this application. Briefly, such kinescope includes a target screen whose covering comprises two superposed cathodoluminescent layers that emit red and cyan light respectively when excited by a beam of electrons. When the accelerating voltage of the kinescope is adjusted to provide a beam with a relatively low level of energy, electrons can penetrate only into the red layer, which is closer to the gun, causing the color of the light on the screen to be red; and when the voltage is adjusted to provide a beam with a particular relatively higher level, electrons can penetrate into the cyan layer simultaneously exciting both layers to produce red and cyan light in such relative proportions that the light on the screen appears to be achromatic.

To reproduce a scene in color with a one-gun kinescope such as this, it is necessary to apply the red video signal to the gun when the accelerating voltage is adjusted to provide the lower energy beam; and to apply the green video signal to the gun when the accelerating voltage is adjusted to provide the higher energy beam. This involves a sequential switching of the video signal applied to the gun between the red and green in synchronism with the sequential switching of the adjustment to the accelerating voltage. When the switching occurs at the field frequency the result is a field sequential color system in which a color frame corresponds to a scanning frame. In view of the fact that only red and green video signals are necessary to the red-white system, and, with a one-gun kinescope, that such video signals are reqiured sequentially, it is readily apparent that the standard color television signal, from which information on the red, green and blue content of each picture element can be obtained simultaneously, will provide more color information than is actually needed. This suggests that conventional decoding processes, such as those associated with tri-color kinescopes and which can recover the simultaneous red, green and blue signals contained in a standard color signal, can be coupled with a properly synchronized gating circuit in order to sequentially apply the proper one of either the red or green video signals to the kinescope gun. While satisfactory operation will be achieved, this approach fails to take advantage of particular properties of both the standard transmitted signal and the red-white system of color analysis which permit a much simpler decoder to be utilized. It is the provision of a decoder of this type that constitutes the primary object of the present invention.

Before briefly describing the present invention, the components of a transmitted color television signal that meets the technical standards of the FCC will be reviewed in order to provide an antecedent basis for the terminology used in this disclosure. Basically, the standard broadcast color signal has a porttion which conveys only brightness information and is independent of the color of the scene being televised; and a portion which conveys only color information and is independent of the brightness of the scene. Brightness information is supplied by a luminance or Y signal matrixed from the video signals derived from the synchronized and simultaneous scanning of red, green and blue color-separation images of the scene in proportion to the contribution of each color to brightness. The Y signal has a 4 mc. bandwidth and will produce a high quality monochrome picture on the viewing screen of a tri-color receiver. Color is added to this monochrome picture by the I and Q signals which constitute the color information portion of the broadcast signal. The bandwidths of the I and Q signals and the precise manner in which they are matrixed from the primary color video signals, provide the monochrome picture with only so much of the red, green and blue content of each picture element as is necessary for the reproduced scene as a whole to be interpreted by an average observer as being in full color. In large colored areas of the scene, which produce video frequencies less than 0.5 mc., the average observer easily resolves all three primary colors; and all three signals must be present in this frequency range to permit the large areas to be reproduced in full three-color fidelity with a tri-color kinescope. In medium size colored areas which produce video frequencies between 0.5 and 1.5 mc., the average observer delineates most sharply between orange-red and blue-green; so that only two signals need be present in this frequency range to permit this special two-color reproduction of medium sized area. Accordingly, the Q signal is the narrow band chrominance component and is bandlimited to 0.5 mc.; while the I signal is the wideband chrominance component whose frequency extends to 1.5 mc. and is matrixed from the primary color video signals to provide color information along the orange-red to blue-green axis of the chromaticity diagram. For fine colored detail, which produce video frequencies exceeding 1.5 mc., resolution is by way of variation in brightness, so that only the Y signal need be present.

Having established the minimum information which is required for reasonable reproduction of the scene in color, the three signals are so coded that the broadcast color television signal simultaneously transmits the luminance (brightness), dominant wavelength (hue), and purity (freedom from dilution by white light) coordinates of the scanned picture element. The I and Q signals provide the latter coordinates because of the manner in which the FCC signal is broadcast. The broadcast signal is required to correspond to a luminance component (the Y signal) transmitted as amplitude modulation of the main picture carrier of the television channel and a simultaneous pair of chrominance components (the I and Q signals) transmitted as the amplitude modulation sidebands of a pair of suppressed subcarriers in phase quadrature having the common frequency relative to the picture carrier of 3.58 mc. To develop this required color signal, the total video voltage which is modulated on the main picture carrier (not including sync and blanking information) includes the Y signal, already described, and a chrominance signal obtained by generating a 3.58 mc. color subcarrier, splitting it into subcarrier components that are in phase quadrature and modulating each of the I and Q signals on a different one of the subcarrier components using a suppressed subcarrier modulation technique. The resultant signal, containing only the sidebands of the two quadrature subcarrier components, is termed the coded chrominance signal. It is in the form of a 3.58 mc. subcarrier whose amplitude, when a given picture element is being scanned, is a measure of the product of the luminance and purity of the element, and whose phase is a measure of the dominant wavelength of the scanned element. Roughly, it can be considered that the amplitude of the chrominance signal determines the saturation of the color to be reproduced and the phase determines the dominant wavelength.

Since suppressed subcarrier transmission is involved, recovery of the intelligence contained in the chrominance signal involves a synchronous demodulation process which requires, in one standard approach to decoding, creating at the decoder, two 3.58 mc. subcarriers in phase quadrature. The latter may be developed by splitting the output of a suitable stable local oscillator of the required frequency into quadrature components to define a pair of decoder subcarriers; but phase information must be available if the phases of the latter are to be related to the phases of the two subcarrier components of the color subcarrier. To provide such information, a burst of the color subcarrier is gated onto the back porch interval of the horizontal blanking pulses which are generated at the transmitter for line sync purposes. The burst is used at a receiver in an automatic phase control loop to reference the phase of the output of the local oscillator to the phase of the burst.

As indicated above, the video voltage $E_m$ used to modulate the main picture carrier is the sum of the Y signal and the chrominance signal $E_c$. The latter can be expressed mathematically as follows:

$$E_c=I\cos(\omega t+33°)+Q\sin(\omega t+33°) \quad (1)$$

where $$I=-0.27(B-Y)+0.74(R-Y) \quad (2)$$

$$Q=0.41(B-Y)+0.48(R-Y) \quad (3)$$

$$Y=0.3R+0.59G+0.11B \quad (4)$$

$R$=video signal dependent on red content of picture element $G$=video signal dependent on green content of picture element $B$=video signal dependent on blue content of picture element $R-Y$=red color difference signal which is a measure of the red content of a picture element less all brightness information $B-Y$=blue color difference signal $\omega$=angular frequency of the color subcarrier, radians per second $t$=time, seconds.

The phase reference in Eq. 1 is the phase of the burst plus 180°. Since the I phasor leads the Q phasor by 90°, it follows that the phase of the color subcarrier (burst) must lag the I and Q signals by 303° (180°+123°) and 213° (180°+33°) respectively. This is accomplished in practice by causing the phases of the components of the color subcarrier on which the I and Q signals are modulated to lag the burst by 57° and 147° respectively.

Below 500 wc., which is the only frequency range in which the Y, I and Q signals can exist simultaneously, the chrominance signal has the following form:

$$E_c=\frac{R-Y}{1.14}\cos\omega t+\frac{B-Y}{2.03}\sin\omega t \quad (5)$$

$$=|E_c|\sin(\omega t+\phi) \quad (6)$$

where: $|E_c|$=magnitude of the coded chrominance signal $$=\left[\left(\frac{R-Y}{1.14}\right)^2+\left(\frac{B-Y}{2.03}\right)^2\right]^{1/2} \quad (7)$$

$\phi$=phase angle of the coded chrominance signal $$=\tan^{-1}\left(\frac{R-Y}{1.14}\right)\times\left(\frac{2.03}{B-Y}\right) \quad (8)$$

As can be seen by inspection of Eq. 6, the coded chrominance signal is indeed in the form of a 3.58 mc. subcarrier modulated in both amplitude and phase according to the color content of the picture elements. The phase of the coded chrominance signal Eq. 8, is an angle whose tangent is proportional to the ratio of two color difference signals, so that the angle associated with a scanned picture element is independent of the saturation of the primary color components of such picture element, and dependent only on the dominant wavelength of the light emanating from the element. It will be recalled that the dominant wavelength of colored light is the wavelength of homogeneous spectral light that must be mixed with achromatic light to achieve a visual match with the colored light. The variation of phase of a coded chrominance signal for a number of important colors is indicated in chart A:

CHART A

| Color | Normalized primary color video signal R | G | B | Y | Phi, degrees | Chrominance phasor leads burst by degrees |
|---|---|---|---|---|---|---|
| Saturated red | 1 | 0 | 0 | 0.3 | 103.5 | 283.5 |
| Saturated green | 0 | 1 | 0 | 0.59 | 240.7 | 60.7 |
| Saturated blue | 0 | 0 | 1 | 0.11 | 347 | 167 |
| Saturated cyan | 0 | 1 | 1 | 0.70 | 283.5 | 103.5 |

The synchronous demodulation of a coded chrominance signal of the form shown in Eq. 6 with a reference signal at the color subcarrier frequency and a phase $\phi_x$ is termed synchronous demodulation at $+\phi_x°$. The output of a synchronous demodulator is proportional to the product of the magnitude of the coded chrominance signal and the cosine of the angle between the phasor representing the chrominance signal and the phasor representing the reference signal. If the signal obtained as a result of synchronous demodulation at $\phi_x°$ is termed $e_x$, then:

$$e_x=|E_c|\cos(\phi-\phi_x) \quad (9)$$

where the angle $\phi$ is a function of the dominant wavelength of the scanned picture element as already indicated. From the definitions of Eqs. 6 and 7 and trigonometric identities, Eq. 9 reduces to:

$$e_x=\frac{R-Y}{1.14}\sin\phi_x+\frac{B-Y}{2.03}\cos\phi_x \quad (10)$$

$$=(rR)+(gG)+(bB) \quad (11)$$

where $$r=0.63\sin(\phi_x-13.5°) \quad (12)$$

$$g=-0.59\sin(\phi_x+29°) \quad (13)$$

$$b=-0.45\sin(\phi_x-77°) \quad (14)$$

By simultaneous synchronous demodulation of separate portions of the coded chrominance signal with a pair of decoder subcarriers at different angles, two detected signals are simultaneously developed, each of which provides a single equation in three unknowns, namely R, G and B which represent the red, green and blue luminances in the scanned picture element. The third simultaneous equation in the same three unknowns is the Y signal. Matrixing of the two detected signals with the Y signal (simultaneous solution) actually provides the quantities R, G and B which can be applied to the red, green and blue guns of a tri-color kinescope. It should be noted that synchronous demodulation at 123° and 33° provides the I and Q signals respectively, and this process is sometimes referred to as demodulation along the "I" and "Q" axes. The equations in the three unknown luminances resulting from synchronous demodulation along significant axes, and obtained from Eq. 8, are listed in chart B:

CHART B

| $\phi_x$, degrees | Phase relative to burst, degrees | Axis | $e_x$ |
|---|---|---|---|
| 0 | −180 | "B−Y" | 0.49 (B−Y) |
| 90 | −90 | "R−Y" | 0.877 (R−Y) |
| 103.5 | −76.5 | "Red" | 0.63R−0.43G−0.20B |
| 123 | −57 | "I" | 0.60R−0.28G−0.32B |
| 236.8 | −303.2 | "G−Y" | 1.42(G−Y) |
| 241 | −299 | "Green" | −0.46R+0.59G−0.13B |

Referring now to the present invention, the basic concept rests on a recognition of a particular feature of the broadcast color television signal that is complementary to the operation of a kinescope utilizing the red-white principle of color television. The latter, it will be recalled, involves controlling emission of red light from a picture element on the viewing screen in accordance with the red content of the corresponding picture element in the scene being televised, and controlling emission of achromatic light in accordance with the green content. By a process not entirely understood at the present time, this will cause the scene being televised to appear in full color to an observer even though picture elements on the viewing screen emit only red and achromatic light. However, experience indicates that color quality is relatively insensitive to the purity of the signals used to control emission of the red and achromatic light. For example, it has been found that only a small degradation in color quality occurs when the content of the picture elements used to control emission of red light on the screen is only essentially red (i.e., includes a smaller amount of other primary colors) rather than purely red; and when the content used to control emission of achromatic light is only essentially green rather than purely green. Such degradation becomes most apparent when pictures reproduced using both types of signals can be compared side-by-side. However, an observer normally cannot make a comparison of this nature, and will generally be satisfied with the color quality resulting from the use of essentially red and essentially green signals. The possibility of obtaining from the coded chrominance signal a single linear combination of the red, green and blue content of each picture element which is so related to the same variables in the Y signal that a simultaneous solution (i.e., matrixing) produces a pair of signals which are essentially red and essentially green, is the feature of the broadcast color signal referred to above which complements the operation of a red-white kinescope. Such single linear combination can be obtained from the coded chrominance signal by a single synchronous demodulation along certain axes. Therefore, a simplified red-white color television decoder would require only one rather than two synchronous demodulators. For example, synchronous demodulation along the "red" axis produces, for a scanned picture element, the following detected signal:

$$e_{103.5^\circ}=0.63R-0.43G-0.20B \quad (15)$$

The Y signal is another linear combination of the three primary color components of the scanned element, namely that listed in Eq. 4, and a pair of linear combinations of $e_{103.5^\circ}$ and Y that produce a video signal $e_r$ which is functionally related to essentially the red content of a scanned picture element, and a video signal $e_g$, which is functionally related to essentially the green content, is the following:

$$e_r=Y+136e_{103.5^\circ}=1.16R-0.16B \quad (16)$$

$$e_g=Y-0.48e_{103.5^\circ}=0.8G+0.2B \quad (17)$$

The video signal $e_r$, applied to the gun of a one-gun "red-white" color kinescope when the light from the screen is reddish; and the signal $e_g$, applied to the gun when the light from the screen is achromatic, will permit the scene being televised to be reproduced in acceptable color. For this reason, the signal $e_r$ is termed the "decoder red-video signal" and the signal $e_g$ is termed the "decoder green-video signal." The degradation of color quality as a result of the blue adulteration of the decoder red and green video, is tolerable. Since color quality appears to be quite insensitive to minor color adulterations in the decoder red and green video signals, the exact matrixing relationship and the exact angle at which synchronous demodulation occurs are not critical, with the result that component aging affecting the angle at which demodulation occurs as well as the matrixing constants, appears to produce only a second order shift in color quality. This factor plus the ability to utilize only one rather than two synchronous demodulators materially lessens the complexity of a decoder suitable for "red-white" color television receivers in comparison to the decoder necessary for conventional tri-color receivers.

One of the broadest views of this aspect of the invention, then, is essentially that a pair of video signals, representative of two different color characteristics of the scene being televised (red and green for red-white television, but orange and cyan for one form of conventional "two primary color" television), can be recovered from the FCC approved signal by synchronously demodulating the chrominance signal at such an angle that the matrixing of two components of the demodulated signal with the luminance signal provides the sought after pair of video signals.

It should be recalled that a one-gun kinescope requires the sequential presentation to the gun of the decoder red video and the decoder green video. In a simultaneous transmission and decoding system, such as the one described above which uses a single synchronous demodulator to produce the decoder red and green signals simultaneously, it is conventional to employ some type of switching arrangement by which one at a time of the two available video signals is sequentially applied to the gun. The second aspect of the invention, incorporating improvements invented by Donald M. Sandler, involves a recognition that the two desired and unadulterated video signals can be obtained sequentially from a coded chrominace signal containing simultaneous information on the red, green and blue content of a scanned picture element by synchronously demodulating the coded chrominance signal, sequentially, at predetermined angles that produce the desired unadulterated video signals. With this approach, the demodulator itself performs the switching function thus further reducing the decoder complexity while at the same time permitting recovery of unadulterated red and green video signals. For example, synchronous demodulation can be carried out at the field frequency along "R−Y" axis and the "G−Y" axis to obtain the red and green color difference signals by shifting the phase of the decoder subcarrier relative to the burst from −90° to −303.2° (see Chart A) with a square wave synchronized with the vertical sync pulses. Dematrixing to obtain the red and green signals can then be accomplished using a keyed matrix-amplifier to provide the proper channel gain associated with demodulation on these two axes, and using the kinescope to add the inverted luminance signal to the two color difference signals as they are applied sequentially to the grid of the kinescope. Since the net voltage controlling the beam is the grid-to-cathode voltage, the kinescope itself adds the luminance signal to each of the color difference signals permitting the unadulterated red and green video signals to be applied, sequentially, to excitation of the cathodoluminescent elements of the target.

One of the broadest views of the second aspect of the invention is essentially that a sequential pair of video signals, individually representative of two different color charactreistics of the scene being televised, can be recovered from the FCC approved signal by sequentially synchronously demodulating the chrominance signal at two different angles selected such that keyed, individual matrixing of the sequential pair of demodulated signals with the luminance signal provides the sought after sequential pair of video signals.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein:

FIG. 2(*a*) is a phase diagram of the coded chrominance signal showing the amplitude and phase of the chrominance signal that results from the scan of a particular picture element;

FIG. 2(*b*) is a phase diagram of the coded chrominance signal showing the results obtained by synchronous demodulation of the signal at three different angles;

FIG. 4(*a*) is a block diagram showing the element of FIG. 4 requiring modification in order to utilize decoder red and green color difference signals;

Figures 1, 2A, 2B:
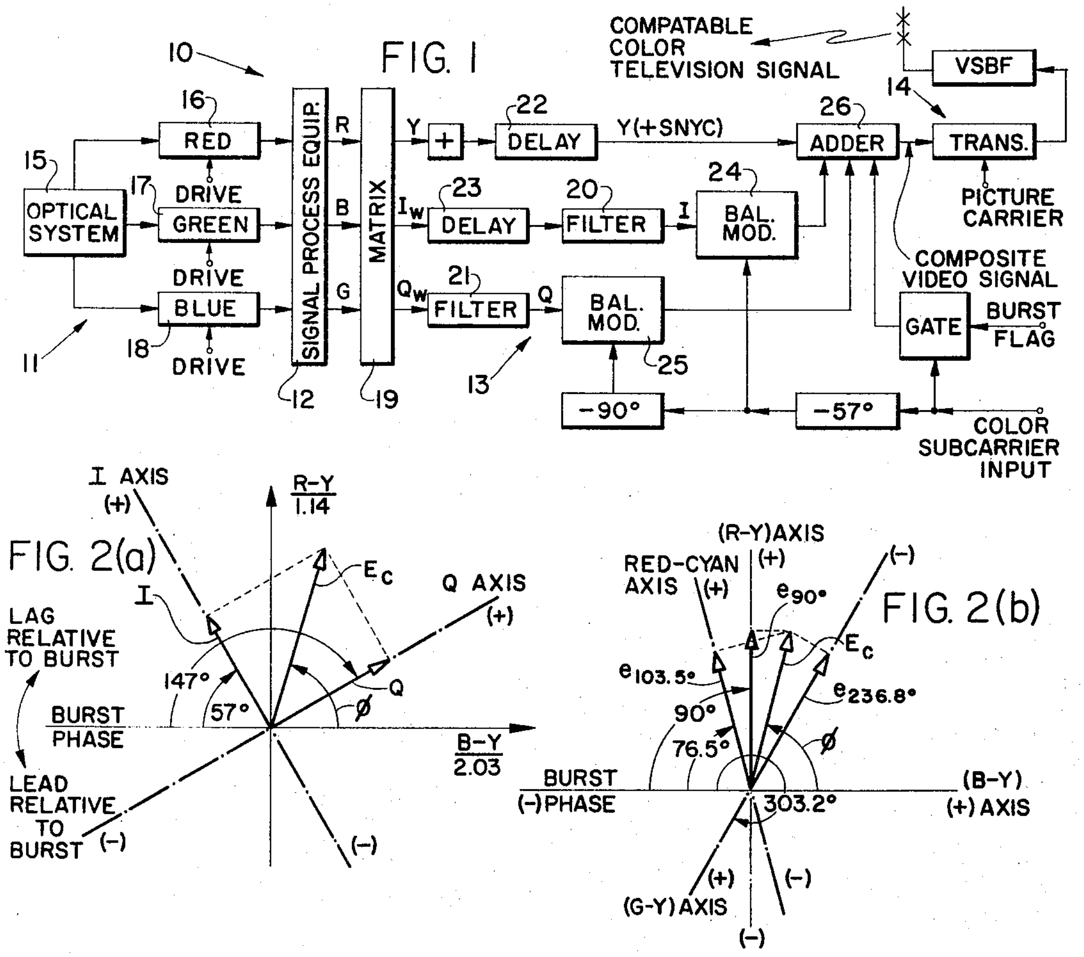
FIGURE 1 is a block diagram of transmitter apparatus for coding the red, green and blue video signals individually associated with the scans of the three color-separation images according to FCC regulations to produce and transmit a composite video signal made up of a luminance signal and a phase and amplitude modulated chrominance signal.

Referring now to FIGURE 1, reference numeral 10 designates equipment for generating and transmitting color television signals in accordance with the technical standards established by the Federal Communications Commission. Such equipment forms no part of the present invention, being entirely conventional, and is included in block diagram form for reference purposes only. Equipment 10 comprises direct pick-up camera 11, signal processing equipment 12, color coder 13 and radio transmitter 14. Apparatus for developing the four basic timing signals: horizontal drive, vertical drive, blanking and sync are not shown, it being understood that such apparatus develops the timing signals from a master oscillator (not shown) stabilized to produce a 3.579545 mc. continuous-wave signal (the nominal 3.58 mc. color subcarrier).

Camera 11 contains a light splitting optical system 15 for the purpose of presenting a red color-separation image of the scene being televised to the sensitive surface of pick-up tube 16, termed the "red" pick-up tube; a green color-separation image to pick-up tube 17, termed the "green" pick-up tube; and a blue color-separation image to pick-up tube 18, termed the "blue" pick-up tube. The pre-amplifiers and the horizontal- and vertical-scanning generators normally associated with each color channel of camera 11 have been omitted to simplify the drawing, it being understood that each channel is provided with adjustments so as to have identical characteristics. As is conventional, the drive pulses applied to each of tubes 16, 17 and 18 cause the scanning beam of each to be deflected in synchronism according to the standard odd-line interlaced scanning program; and the resultant outputs of the three tubes are applied to signal processing equipment 12 in order to accomplish gamma correction, aperture control, shading correction and pedestal insertion. As a consequence of this, there are three primary color outputs from equipment 12 labeled in the drawing R, G & B. Output R, associated with red pick-up tube 16 produces a signal proportional to the red constant of the scanned picture elements, and is termed the "red video signal"; output G, associated with green pick-up tube 17 produces a signal proportional to the green content of the scanned picture elements, and is termed the "green video signal"; and output B, associated with blue pick-up tube 18, is termed the "blue video signal." Since the scanning of the photosensitive areas of the pick-up tubes is synchronized (with the three tubes in registration to provide rasters having identical sizes, shapes and positions relative to the scene being televised), the same picture element of each color-separation image is scanned simultaneously. Thus, at any instant, each video signal is representative of the brightness of a different one of the primary colors contained in the same picture element.

After gamma and other necessary corrections, the R, G and B camera signals are applied to color coder 13 in order to adapt them for compatible transmission with the existing 6 mc. television channel. The color coder accomplishes its function by the use of matrixing, suppressed-carrier modulation, quadrature modulation, VSB transmission of the I signal, and bandwidth limitation of the Q signal, together with various incidental gating, adding and subtracting operations, all of which are conventional. Matrix circuit 19 linearly combines the R, G and B signals in accordance with Eqs. 2, 3 and 4 to define the $I_w$ and $Q_w$ signals and the Y signal respectively, where the subscripts on the chrominance components indicate that they are wideband at this point in the circuit. Filters 20 and 21 limit the video frequency chrominance signals to 1.5 mc. for I and 0.5 mc. for Q; and delay lines 22 and 23 in the wider band channels equalize the time passage for all signal components. The 3.58 mc. color subcarrier is delayed 57° and split into two components, one of which is modulated at 24 with the I signal and the other of which is delayed by 90° and modulated at 25 with the Q signal. Modulators 24 and 25 are doubly balanced to produce only the sideband frequency components. Finally, the luminance signal Y, the quadrature sideband outputs of modulators 24 and 25, deflection-sync signals and the color burst are all summed in adder 26 whose output is termed the composite video signal and constitutes the total video voltage modulated on the main picture carrier to produce the broadcast compatible color television signal previously described in detail.

As indicated previously, the composite video signal modulated on the main picture carrier (less sync information) comprises the Y signal and the chrominance signal, the latter being in the form of a 3.58 mc. subcarrier whose phase, when a given picture element is scanned, is determined by the dominant wavelength of the scanned element, and whose amplitude is determined by the saturation of the color. A phase diagram for the coded chrominance signal is shown in FIG. 2(*a*) to which reference is now made. The color subcarrier component on which the I signal is modulated lags the color subcarrier (burst) by 57°; and the color subcarrier component on which the Q signal is modulated lags the color subcarrier by 147°. FIG. 2(*a*) shows the instantaneous I and Q phasors resulting from the scanning of a picture element having some arbitrary combination of the three primary colors. The instantaneous $E_c$ phasor in FIG. 2(*a*), obtained by the vector addition of the I and Q phasors, indicates that the scanned picture element corresponding to this $E_c$ phasor must be blueish-red since the first quadrant of the chrominance phase diagram defines colors that lie in the range red to magenta to blue. The second quadrant defines colors in the range red to orange to yellow; the third quadrant defines colors in the range yellowish-green to green to blueish-green; and the fourth quadrant defines colors in the range cyan to blue.

The result of synchronous demodulation of the coded chrominance signal shown in FIG. 2(*a*) along three representative axes is shown in FIG. 2(*b*). Synchronous demodulation, it will be recalled, provides a demodulated signal whose amplitude is proportional to the product of the magnitude of the coded chrominance signal and the cosine of the angle between the latter signal and the decoder subcarrier reference signal. In other words, synchronous demodulation provides the projection of the coded chrominance signal on the axis identified with the phase of the decoder subcarrier reference signal. Chart B lists the color content of the demodulated signal for the axes shown in FIG. 2(*b*); and Chart A lists the phase of the decoder subcarrier reference signal necessary to demodulate along the axes listed.

From the linear combination of the three primary color variables contained in the demodulated chrominance signal (see Chart B), and the linear combination of the variables contained in the luminance signal, various matrix arrangements can be formed to obtain simultaneous decoder red and green video signals. When demodulation occurs along the positive (R–Y) axis, the matrix arrangement of FIG. 3(*a*) can be used. Here, the decoder red video is obtained by adding the luminance signal to 1.14 times the demodulated signal. The sum is the unadulterated red signal and corresponds to the red video output associated with red pick-up tube 16. The decoder green video, obtained by subtracting 0.49 times the demodulated signal from the luminance signal, contains a portion of the blue signal but it is related to essentially the green content of the scanned element. The term "related to essentially the green content" refers to a situation where the green portion in the decoder signal constitutes more than 50% of the whole signal.

Figure 3:
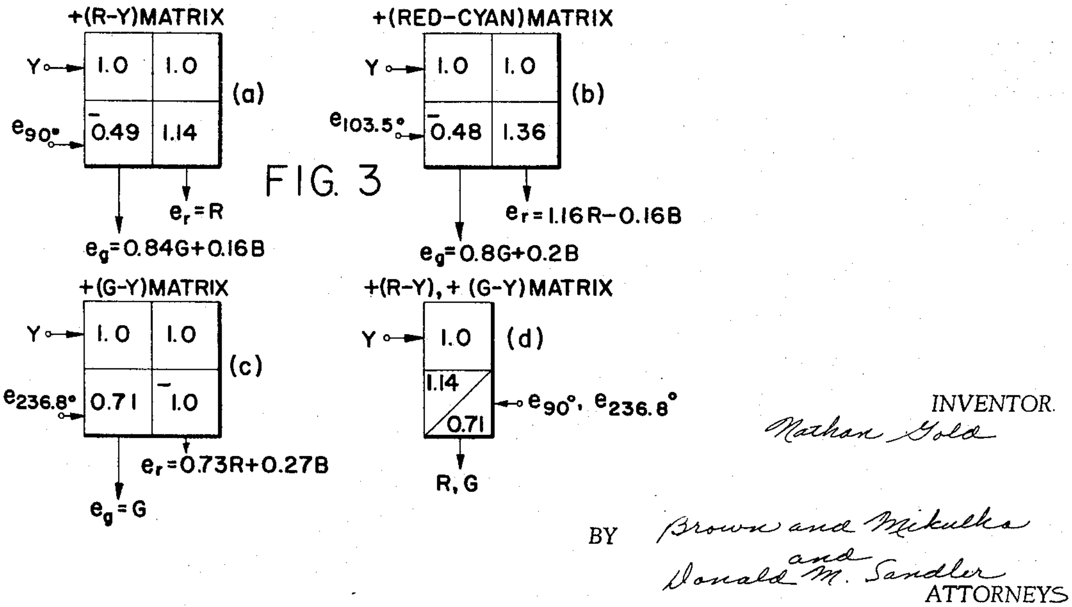
FIG. 3 shows various matrix arrangements for generating from the single demodulated chrominance signal a pair of decoder red and green video signals suitable for use by a red-white color kinescope.

FIG. 3(*b*) shows one of many matrix arrangements for obtaining a pair of signals functionally related, individually, to essentially the red and green content of the picture elements when demodulation along the positive red-cyan axis is employed. Many other matrix arrangements could be used, each producing a somewhat different proportion of extraneous primary color signals in each of the two decoder signals. For example, another matrix arrangement for the decoder red video signal is:

$$e_r = Y + 0.55e_{103.5°} = 0.65R + 0.35G$$

which would provide a signal related to the yellowish-red content of the picture element.

FIG. 3(*c*) shows a matrix arrangement that could be used when the demodulation is carried out along the positive G–Y axis. Here, the decoder green video signal is unadulterated, but the decoder red video signal, although essentially dependent on the red content of the picture element, also contains part of the blue camera signal.

Figure 4:
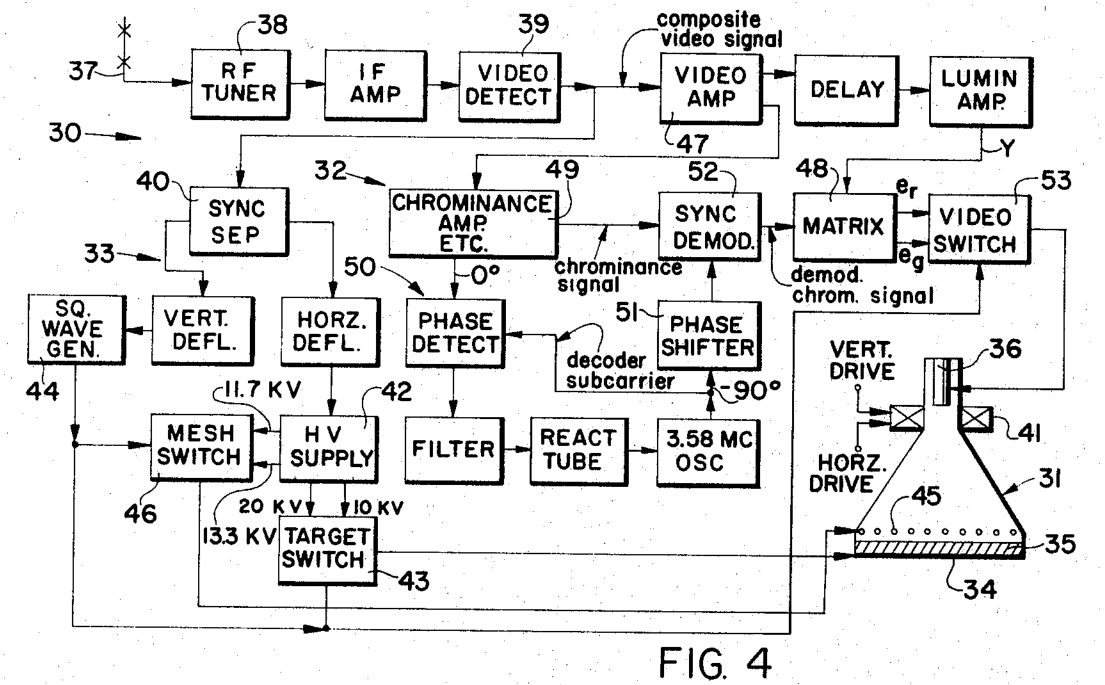
FIG. 4 is a block diagram of a television receiver showing one form of the simplified decoder in which decoder red and green video signals are obtained.

Apparatus by which the technique of obtaining essentially red and green decoder video signals by a single synchronous demodulation along a preselected axis followed by matrixing with the luminance signal, can be applied to a one-gun kinescope that operates on the red-white principle of color analysis, is shown in FIG. 4 to which reference is now made. Reference numeral 30 designates a receiver into which such apparatus is incorporated and includes bi-color kinescope 31, decoder 32 and receiver circuitry 33. As indicated in copending application Serial No. 297,341 referred to above, kinescope 31 includes at one end, a viewing screen 34 having a covering 35 thereon that constitutes a target for a beam of electrons produced by single electron gun 36 at the other end of the kinescope. Covering 35 can be constituted by two superposed granular cathodoluminescent layers which emit red and minus-red (cyan) light respectively, with the red light emitting layer being closer to the gun and being uniformly distributed over but covering less than 100% of the viewing screen. Additionally, a nonluminescent barrier layer separates the two cathodoluminescent layers. With this construction, about a 10 kv. accelerating (target) voltage is sufficient to excite only the red light emitting layer, with inerstitial electrons of this energy that pass between the granules being stopped short of the minus-red layer by the barrier layer; and red light is produced on the screen. At higher accelerating voltages, however, interstitial electrons have sufficient energy to pass through the barrier layer and penetrate the minus-red layer whereby both the red and minus-red layers are simultaneously excited; and particularly, at about 20 kv., both layers will be simultaneously excited into emission of substantially the same amount of light whereby achromatic light is produced on the screen. Thus, red-white color switching can be achieved by modulating the accelerating voltage between 10 kv. and 20 kv.

In operation, a broadcast color television signal received at antenna 37 is converted to IF by tuner 38, amplified and then detected at 39 to produce the composite color signal that existed at the input to the transmitter at the sending end of the television system. Sync information is separated at 40 from the composite color signal and applied to the horizontal and vertical deflection generators which produce sawtooth current pulses that are applied to the horizontal and vertical windings of deflection coil 41 of the kinescope to cause the beam to trace out the conventional raster in the terms of sequential interlaced fields. Associated with the horizontal deflection generator is high voltage power supply 42 which provides the 10 and 20 kv. potentials that must be applied sequentially to covering 35 by means of electronic switch 43, the action of which is synchronized with the scanning of each field of a frame by the output of square wave generator 44 producing a square wave at the field frequency and synchronized with the vertical pulses derived from the vertical deflection circuit. As a result of this arrangement, the voltage on covering 35 remains at 10 kv. during one field scan of the covering by the beam to produce a red field, and at 20 kv. during the next field scan to produce a white field interleaved with the red field.

Figure 5:
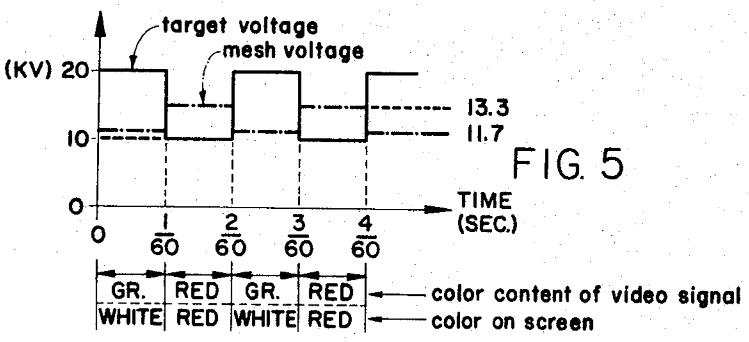
FIG. 5 is a synchronization diagram showing how color switching is obtained and the relationship between the color of the video and the color of the screen.

Modulation of the target voltage at the field frequency normally results in the red field being larger than the white field with the result that images reproduced during successive fields will not be in registration unless compensation is provided. To this end, it is conventional to provide an electron permeable mesh designated by reference numeral 45 between the gun and covering 35, and as close to the latter as possible but electrically insulated from the covering. As indicated in copending application Serial No. 344,914, filed February 14, 1964, and owned by the assignee of the present application, misregistration between the two fields can be reduced to a minimum by applying a voltage to mesh 45 that is modulated in synchronism but 180° out-of-phase with modulation of the target voltage. In particular, good registration is achieved in kinescopes where the target voltage is modulated between 10 and 20 kv. when the mesh voltage is modulated about an average voltage of 12.5 kv. with a peak-to-peak signal of about 1600 volts. These desired voltages can be obtained from power supply 42 and applied to mesh 45 by way of electronic switch 46, the action of which is synchronized with the scanning of each field by the output of square wave generator 44. The sequence and phase relationships between the target and mesh voltages are indicated in FIG. 5, which also indicates that reproduction of the scene in color requires a video signal based on the green content of the scene being televised to be applied to the gun during the time intervals that the target voltage is maintained at 20 kv., and on the red content during the time intervals that the target voltage is maintained at 10 kv.

It is the function of decoder 32 to provide video signals based on the red and green contents of the scene being televised and to sequentially present such signals to the gun of the kinescope properly synchronized with the color switching operation. In operation, the composite color signal at the output of detector 39 is amplified at 47 and in a conventional manner, the chrominance and luminance components of the composite color signal are separated. The luminance component is delay, amplified and applied to matrix 48. The chrominance signal is selected by the chrominance amplifier, which, typically, may include a bandpass "take-off" filter, the amplifying tube, a "shaping" filter plus trapping again 4.5 mc., all indicated schematically at 49. The selected chrominance signal is applied via the "burst take-off" connection to a gated amplifier (not shown) which, under control of the horizontal flyback pulses, transmits color bursts to the APC (automatic phase control) circuit 50. This is a conventional approach to providing an error signal to control the decoder subcarrier phase and forms no part of the present invention. In passing, however, it should be noted that the phase detector of a conventional APC loop, which also includes a filter, reactance tube and 3.58 mc. oscillator, produces an error voltage which is a sinusoid function of the difference in phase between the burst and the output of the 3.58 mc. oscillator. Thus, whenever such phase difference is 90°, the error voltage is zero. For this reason the phase of the output of the 3.58 mc. oscillator, which constitutes the decoder subcarrier reference used for synchronous demodulation of the chrominance signal, can be locked to the phase of the burst by ±90°. This disclosure, for reasons that will be apparent hereinafter, is based on a phase of the 3.58 mc. oscillator that lags the burst by 90°. As indicated previously, this places the output of the oscillator on the positive (R–Y) axis, and if matrix 48 were that shown in FIG. 3(*a*), phase shifter 51 would shift the decoder subcarrier by 0° before applying the signal to synchronous demodulator 52. If the phase of the oscillator would lead the burst by 90°, demodulation would occur along negative (R–Y) axis. In any event, the chrominance signal derived from amplifier 49 is also applied to demodulator 52 and, with the contents of matrix 48 matching the phase of the decoder subcarrier, matrix 48 provides two simultaneous signals, $e_r$ and $e_g$ which are sequentially applied to the control grid of electron gun 36 through electronic switch 53 operated in synchronism with the switching of the target and mesh voltages under the influence of the output of square wave generator 44.

To summarize the operation of the receiver shown in FIG. 4, demodulator 52 synchronously demodulates the coded chrominance signal derived from amplifier 49 to provide a demodulated chrominance signal whose color content is specified by the predetermined phase of the decoder subcarrier at the output of phase shifter 51. Matrix 48 whose construction is dependent on such predetermined phase, matrixes the demodulatd signal with the luminance signal to provide two simultaneous video signals, one of which is termed the decoder video signal ($e_r$) and is functionally related to essentially the red content of the element being scanned, and the other of which is termed the decoder green video signal ($e_g$) and is functionally related to essentially the green content of the element. Video switch 53 applies the decoder green video signal to the grid of gun 36 of the kinescope when target switch 43 applies 20 kv. to the target and mesh switch 46 applies about 11.7 kv. to the mesh. This condition prevails for a complete field scan resulting in an achromatic field where the amount of achromatic light is determined in accordance with the decoder green video signal. At the end of this field, under the influence of square wave generator 44, switch 53 switches the decoder red video signal to the grid of gun 36, switch 43 switches the voltage on the target to 10 kv. and switch 46 switches the voltage on the mesh to about 13.3 kv. This condition also prevails for a complete field scan resulting in a red field where the amount of red light is determined in accordance with the decoder red signal. Where the decoder green and red video signals are functionally related, respectively, to essentially the green and red content of scanned picture elements, the scene reproduced on the screen will appear in substantially full color to an observer.

The kinescope itself can be used as a part of the matrixing operation. In this case, the sequential signals that must be applied to the control grid of gun 36 are the decoder red and green color difference signals, respectively, which in this context means the decoder red video signal minus the luminance signal and the decoder green video signal minus the luminance signal, respectively. FIG. 4(*a*) shows the required modification of matrix 48 of FIG. 4, as well as the required change in the connection of the output of video switch 53 to gun 36. Assuming demodulation at 103.5° (positive "red" axis), the output of demodulator 52 is simultaneously applied to circuits 48′ and 48″. Each circuit performs the operation on the demodulated signal indicated by the matrix of FIG. 3(*b*). That is to say, the demodulated signal is multiplied, individually by −0.48 in circuit 48′ and by 1.36 in circuit 48″. The output of circuit 48′ is $-0.48\ e_{103.5°}$ which is $e_g-Y$ for modulation at 103.5°; and the output of circuit 48″ is $1.36\ e_{103.5°}$ which is $e_r-Y$. The two outputs are the decoder green and red video signals respectively, and are applied to video switch 53. The output of this switch is one or the other of these video signals depending upon the polarity of the square wave input, and is applied to the control grid of gun 36. The cathode of the gun is connected to the inverted Y signal so that the grid to cathode voltage on the gun is either the decoder green or red video signals. Therefore, the approach to decoding using the kinescope to perform a portion of the matrixing achieves the same end results as when all of the matrixing is carried out without the use of the kinescope. For this reason, the term "matrixing" as used in the claims is intended to cover both approaches.

Figure 6:
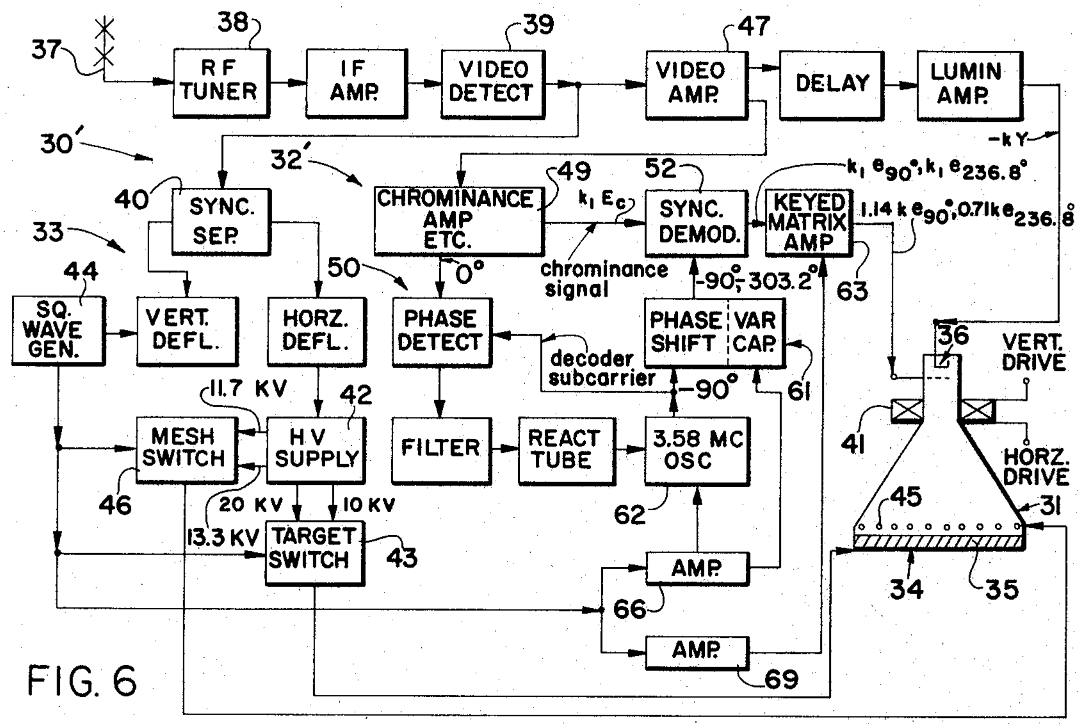
FIG. 6 is a block diagram of a television receiver incorporating further improvements of the aforesaid Donald M. Sandler and showing a further simplification of the decoder in which the demodulator functions as a switch for controlling the sequential application of the video signals to the one gun of the kinescope.

Another embodiment of the invention constructed in accordance with certain improvements made by Donald M. Sandler is shown in FIG. 6. According to this embodiment, apparatus by which video signals related to only the red and green content of the scanned picture elements can be applied sequentially to a one gun red-white kinescope and which utilizes but a single synchronous demodulator is designated by a reference numeral 30′, FIG. 6, where the same reference numerals appearing in the apparatus of FIG. 4 indicate identical components. Receiver circuitry 33 is essentially the same as that shown in FIG. 4, and the main difference in the apparatus shown in FIG. 6 over that shown in FIG. 4 is decoder 32′. As previously indicated, the function of decoder 32′ is to sequentially synchronously demodulate the chromimance signal along the positive (R–Y) axis and the positive (G–Y) axis at the field frequency. Along the positive (R–Y) axis, the demodulated signal is:

$$e_{90^\circ}=0.877\ (R-Y)$$

which means that the unadulterated red video signal associated with the red pick-up tube of the cameras can be obtained using the kinescope as the matrix if the red color difference signal is obtained as follows:

$$R-Y=1.14\ (e_{90^\circ})$$

On the other hand, along the positive (G–Y) axis, the demodulated signal is:

$$e_{236.8^\circ}=1.42\ (G-Y)$$

which means the unadulterated green video signal associated with the green pick-up tube of the camera can be obtained using the kinescope as the matrix, if the green color difference signal is obtained as follows:

$$G-Y=0.71(e_{236.8^\circ})$$

It follows, then, that if the single channel output of the synchronous demodulator is to furnish the red and green color difference signals sequentially to the grid of a kinescope to whose cathode the inverted Y signal is applied, the single channel must feed two matrices, each multiplying the continuous demodulated signal (that actually switches from $e_{90^\circ}$ to $e_{236.8^\circ}$ at the field frequency) by different factors (namely 1.14 and 0.71 respectively). By a properly synchronized switching arrangement like video switch 53 in FIG. 4(*a*), the grid of the kinescope could be switched between the outputs of the two matrices to permit the two cathodoluminescent elements of the kinescope screen, selectively excitable to cause the screen to produce red and achromatic light, to be selectively excited in sequence by a video signal dependent only on the red content of the scene when the screen emits red light, and only on the green contents when the screen emits achromatic light. However, while this approach permits recovery of unadulterated color signals, decoder 32′ provides a simpler device. Decoder 32′ eliminates the video switch because the proper color difference signal is automatically applied to the grid of the kinescope as a result of switching the angle at which demodulation occurs; and the pair of matrices is eliminated by the use of a keyed matrix-amplifier whose operation is synchronized with the angle at which demodulation occurs to provide the matrixing operation necessary to achieve the desired color-difference signal. The total matrixing operation, including that achieved using the grid of the kinescope as well as the matrix amplifier, is schematically illustrated in FIG. 3(*d*) where the operations, carried out sequentially rather than simultaneously as in the case of the other matrices in FIG. 3, are as follows:

$$R=1.14(e_{90^\circ})-Y$$
$$G=0.71(e_{236.8^\circ})-Y$$

Figures 7, 8:
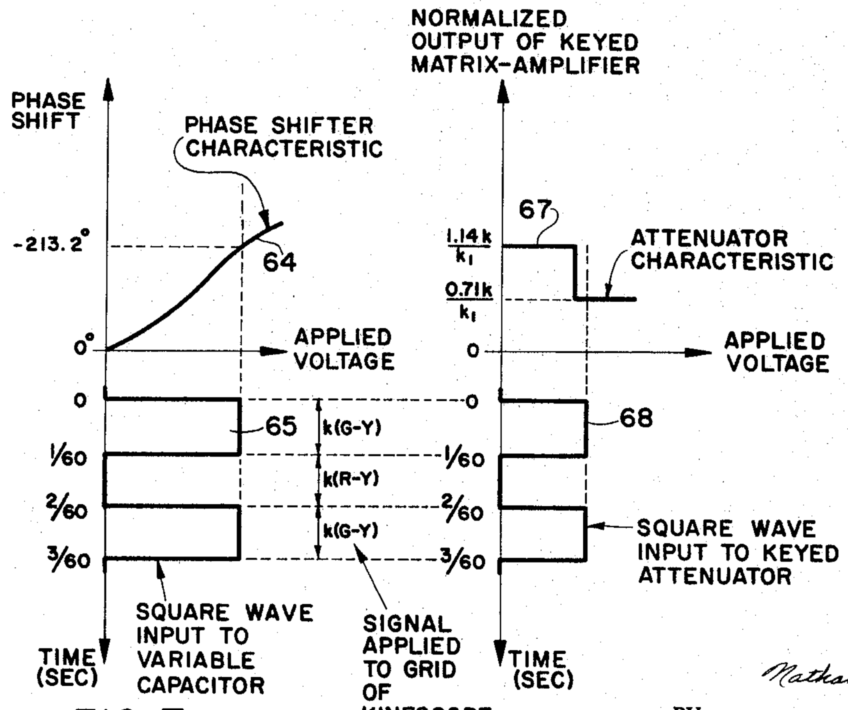
FIG. 7 is typical of the response characteristic of a modulated phase shifter.
FIG. 8 is typical of the response characteristic of a voltage-sensitive variable attenuator which is part of a keyed matrix-amplifier.

The operation of the apparatus in FIG. 6, so far as recovery of the luminance and chrominance signals from the broadcast color television signal and the switching of the color on the viewing screen of the kinescope are concerned, is exactly the same as the operation already described in connection with the apparatus of FIG. 4. However, in FIG. 6, the phase shifter shown at 61 is provided with means for varying the angular shift of the output of the 3.58 mc. oscillator shown at 62 to accomplish sequential demodulation at different phase angles; and keyed matrix-amplifier 63 replaces matrix 48 shown in FIG. 4. Assuming that the phase of the output of oscillator 62 lags by 90° the phase of the burst, it is evident from chart B that phase shifter 61 must vary the phase of the decoder subcarrier reference signal applied to synchronous demodulator 52 between 0° and −213.2° (which is the same as −90° and −303.2° respectively relative to the burst) at the field frequency. This can be accomplished by the use of a voltage-variable capacitor element in the phase shifter, as for example, a reactance tube. Preferably, however, a variable capacitor diode is used. In either event, the phase shifter 61 will have some characteristic that relates phase shift to the voltage applied to the variable capacitor element in a manner suggested by wave 64 in FIG. 7. This establishes the amplitude of the square wave indicated by curve 65 that must be aplied to the variable capacitor element, and it is the function of amplifier 66 to furnish the required signal. Amplifier 66 is driven by square wave generator 44 so that the phase shifter sequentially varies the phase of the decoder subcarrier reference signal between 0° and −213.2° relative to the output of the subcarrier oscillator at the field frequency.

Demodulator 52 and keyed matrix-amplifier 63 represent a demodulator-matrix channel whose characteristic has a value depending upon circuit parameters. For example, if the input to decoder 32′ were $K_1E_c$, where $K_1$ is a constant defining the voltage level after detection, the demodulator-matrix must have characteristics of 1.14 $K/K_1$ to provide an output of K $(R-Y)$ when the local or decoder subcarrier produced by oscillator 62 has an angle of −90° relative to the phase of the burst, and 0.71 $K/K_1$ to provide an output of K $(G-Y)$ when the angle is −303.2°. The value "K" is a constant of proportionality. In other words, the characteristic of the channel must decrease by a factor of about 38% when the phase of the reference signal changes from 0° to −213.2°. This can be accomplished, for example, by using conventional diode waveshaping techniques whereby the application of a square wave signal to a diode of a voltage-sensitive variable attenuator circuit would shift the attenuation of the output of demodulator 52 by the required amount in synchronism with the shifting of the angle at which demodulation occurs. The characteristic of the keyed matrix-amplifier, of which the voltage-sensitive variable attenuator is a portion, may have the shape shown at 67 in FIG. 8. The break in the curve 67 results from a change in the state of conduction of the diode of the variable attenuator, and establishes the amplitude of the square wave indicated by curve 68 that must be applied to variable attenuator circuit; and it is the function of amplifier 69, driven by generator 44, to furnish the required signal.

The sequence of operations of the receiver shown in FIG. 6 is controlled by square wave generator 44. When the output of the latter causes target switch 43 to apply 20 kv. to the target and mesh switch 46 to apply 11.7 kv. to the mesh, the output of amplifier 66 causes the capacitance associated with phase shifter 61 to have a value which places the phase of the decoder subcarrier reference signal applied to demodulator 52 at −303.2° relative to the burst (or −213.2° relative to the output of oscillator 62). The output of demodulator 52 under this condition is $K_1e_{236.8^\circ}$ which, as was shown previously, is 1.42 $K_1$ $(G-Y)$. At the same time, the output of amplifier 69 applied to matrix-amplifier 63 causes the variable attenuator to have a value which results in the output of demodulator 52 ($K_1e_{236.8^\circ}$) being multiplied by the factor 0.71 $K/K_1$. This yields K $(G-Y)$ at the grid of the gun of kinescope 31. The output of the luminance amplifier is $-KY$ and this is applied to the cathode of the gun. Since the resultant signal on the gun is the difference between the grid and cathode voltage, the video signal controlling the intensity of the beam during the time a field in achromatic light is traced on the viewing screen is KG, a signal proportional to that associated with the green pick-up tube at the camera. When the vertical sync pulse switches the output of the square wave generator such that 10 kv. is switched onto the target by switch 43 and 13.3 kv. is switched onto the mesh by switch 46 for the next field scan, the output of amplifier 66 causes demodulation to switch from 90° to 236.8° (or from −90° to −303.2° respectively, relative to the brust); and the output of amplifier 69 causes the matrix-amplifier to multiply the output of demodulator 42, now $K_1e_{90^\circ}$, by the factor 1.14

$K/K_1$. This yields the signal K $(R-Y)$ at the grid of the gun. The kinescope again performs matrixing with the Y signal. Thus, during the time a field in red light is traced on the veiwing screen, the video signal KR, proportional to that associated with the red pick-up tube at the camera, controls the intensity of the beam. As already indicated, this is the requirement for reproducing a scene in full color using the red-white system of color analysis.

While the preferred embodiment just described provides a keyed matrix-amplifier at the output of the synchronous demodulator, those skilled in the art will appreciate that the variable attenuator portion of the matrix-amplifier could be inserted, instead, in either input to the demodulator.

The embodiments of the invention described above, while particularly well adapted for reproducing a scene in color using the red-white system of color analysis, can be used to advantage in a conventional two-color television system, as, for example, in a red and green system, or in an orange-red and blue-green system. In the latter case, the orange-red content of the scene is reproduced in orange-red light and the blue-green content of the scene is reproduced in blue-green light. Two-color television displays, of which red-white is a special case, are particularly well adapted for use in converting a standard monochrome receiver to a color receiver. As the result of the disclosure of Engstrom et al. in U.S. Patent No. 2,514,043 granted July 4, 1950, those skilled in the art know that a standard monochrome kinescope can be fitted with auxiliary apparatus by which the "two primary colors" of a given system of color analysis can be caused to appear sequentially on the viewing screen of the kinescope at the field frequency. Using the orange-red and blue-green system, for example, rotating color polarizers mounted between an observer and the monochrome kinescope and properly synchronized with the scanning system, will cause the screen to appear, sequentially, orange-red and blue-green. In such case, the sequential signals that must be supplied to the control grid of the monochrome receiver in synchronism with the color of the viewing screen should be a pair of signals corresponding to an orange-red color difference signal and a blue-green color difference signal. The required color difference signals can be obtained by a single synchronous demodulation process at 123°. This corresponds to demodulation along the I axis of the coded chrominance signal phase diagram. In particular, the demodulated chrominance signal has the following form:

$$e_{123^\circ}=0.60R-0.28G-0.32B$$

The orange-red color difference signal can be obtained by taking 34% of the demodulated signal:

$$e_{o-r}-Y=0.34e_{123^\circ}=0.51R+0.49G$$

The blue-green color difference signal can be obtained as follows:

$$e_{b-g}-Y=0.5e_{123^\circ}=0.73G+0.27B$$

Figure 4A:
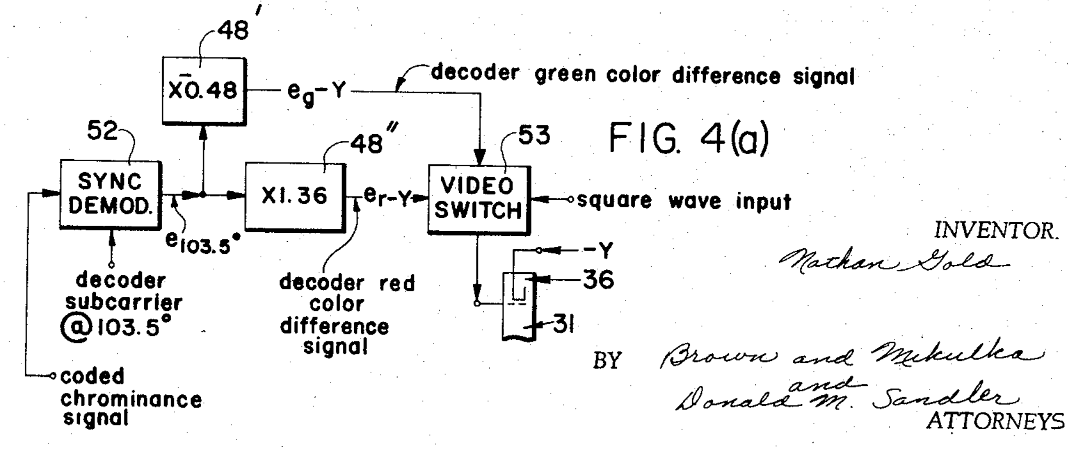

Both of these color difference signals could be applied to a video switch in the manner shown in FIG. 4*a*. When properly synchronized with the color on the monochrome kinescope, the orange-red content of the scene being televised would be reproduced in orange-red light and the blue-green content would be reproduced in blue-green light. The advantage of demodulating along the I axis permits recovery of the widest bandwidth components of the red-blue-green video signals corresponding to the outputs of the red, blue and green cameras at the transmitter location. In the event, that demodulation along the I axis does not produce the optimum color difference signals, or that some other two-color system is used, the embodiment of the invention shown in FIG. 6 can be utilized. If this is the case, demodulation can occur along two different axes producing colors that better match the color filters used with the monochrome receiver.

The embodiment of the invention shown in FIG. 6 is also adapted to be used with a standard three-color sequential television system of the type disclosed by V. K. Zworykin in U.S. Patent No. 2,566,713 granted September 4, 1951. In such case, demodulation would occur sequentially at 90°, to provide the red color difference signal; at 236° to provide the green color difference signal; and at 0° to provide the blue color difference signal. In order to provide the proper relative gain between the different color difference signals, a two-diode voltage-sensitive variable attenuator could be used whereby the keyed matrix-amplifier would multiply the output of the synchronous demodulator by 1.14 $K/K_1$ when the demodulation angle is 90°; by 0.71 $K/K_1$ when the demodulation angle is 236.8°; and by 2.03 $K/K_1$ when the demodulation angle is 0°.

Since certain changes may be made in the above method and apparatus without departing from the scope of the invention herein claimed, it is intended that all matter contained in the above description or shown in the accompanying drawings shall be interpreted as illustrative and not in a limiting sense.

What is claimed is:

1. A television receiver for reproducing a scene being televised in color using the red-white system of color analysis from a color television signal transmitted by modulating on the main picture carrier of a television channel a composite video signal that includes a luminance signal matrixed from the red, green and blue content of a scanned element and representative of its brightness, a coded chrominance signal in the form of a subcarrier of predetermined frequency whose amplitude and phase are functionally related to the saturation and dominant wavelength respectively of the scanned element, and a sync signal to which the phase of said chrominance signal is referred; said receiver comprising:
   (a) a decoder including means for synchronously demodulating said coded chrominance signal at a predetermined phase relative to said sync signal to obtain a single demodulated chrominance signal; and means for matrixing only said demodulated signal with said luminance signal to obtain two simultaneous video signals, the first of which is functionally related to substantially only the red content of said scanned element and the second of which is functionally related to substantially only the green content of said scanned element;
   (b) a kinescope having a viewing screen with at least two different types of cathodoluminescent elements whose selective excitation causes said screen to selectively emit reddish and substantially achromatic light; and
   (c) means for causing said elements to be excited in accordance with said first and second video signals such that said first signal determines the amount of reddish light on said screen and said second signal determines the amount of achromatic light.

2. A television receiver according to claim 1 wherein said kinescope has only one gun and means are provided for sequentially switching the video signal applied to said gun between said first and second video signals.

References Cited

UNITED STATES PATENTS

| | | | |
|---|---|---|---|
| 2,750,438 | 6/1956 | Barco | 178—5.4 |
| 2,921,118 | 1/1960 | Benjamin | 178—5.4 |

OTHER REFERENCES

Loughlin, "Recent Improvements in Band-Shared Simultaneous Color-Television System," proceedings of the I.R.E. January 1951; pp. 1264–1273.

JOHN W. CALDWELL, *Primary Examiner.*

DAVID G. REDINBAUGH, *Examiner.*

J. A. O'BRIEN, *Assistant Examiner.*